United States Patent Office 2,835,958
Patented May 27, 1958

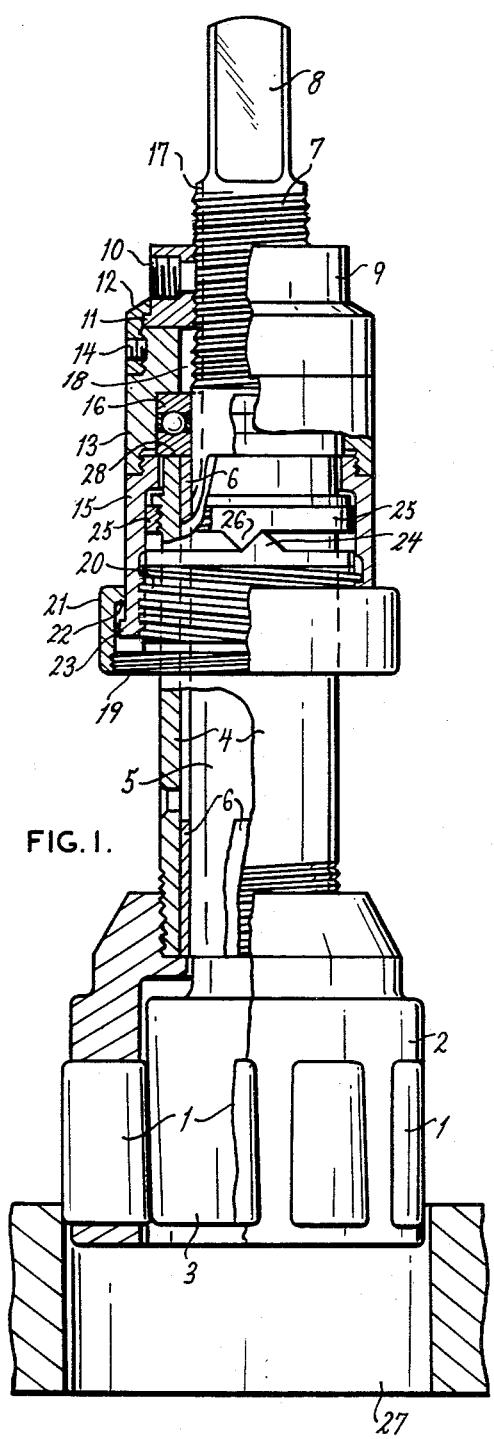
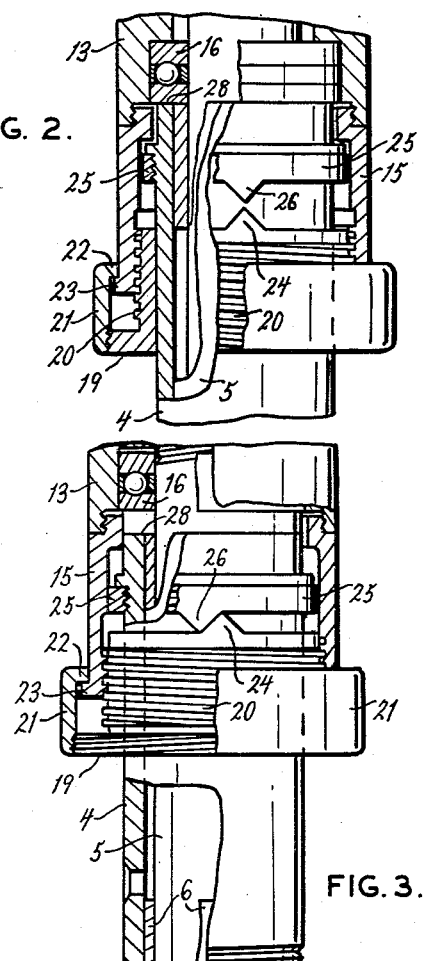
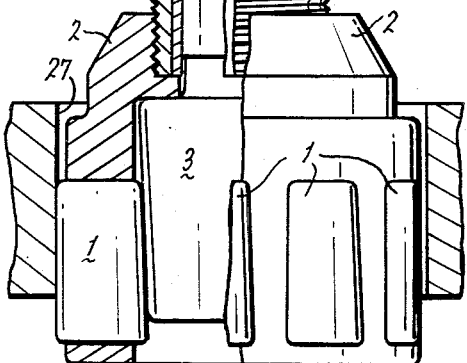
INVENTORS.
LUTHER ROY MOCK
ELDO K. KOPPELMANN
ATTORNEY

2,835,958

ROLLER BURNISHING TOOL

Luther Roy Mock and Eldo K. Koppelmann, Moberly, Mo., assignors to Madison-Faessler Tool Co., a corporation of Missouri Application March 18, 1954, Serial No. 417,088

3 Claims. (Cl. 29—90)

This invention pertains to roller burnishing tools of the expanding type such as are used for burnishing the inside surface of a bore in metal.

A tool of this type ordinarily has a tapered mandrel surrounded by a cage in which a series of tapered rollers is housed, the rollers being inserted into the bore to be burnished and the mandrel then fed into the ring formed by the rollers so as to expand the latter. The mandrel is rotated, causing the rollers to roll in the bore, thereby forming a smooth burnished surface and at the same time feeding the tool along the bore. Such a tool, when made in a large size, is comparatively heavy so that it is difficult to handle by hand while setting the parts to begin operation.

An object of this invention, therefore, is to provide such a tool with means for adjusting the parts relatively to each other, to their positions for starting operation, and holding the parts in such adjustment until the tool begins to operate.

Another object is to provide a tool with such holding means and means whereby upon operation of the tool said holding means will be automatically returned to its initial position so that the parts of the tool may be free for operation in their normal manner.

Further objects will appear from the following description taken in connection with the accompanying drawing, in which—

Fig. 1 is a side view partly in section of a tool embodying this invention with the parts shown in position to start the burnishing operation;

Fig. 2 is a fragmentary view partly in section showing the holding means retracted to its disengaged position; and Fig. 3 is a similar view showing the relation of the parts at the end of the burnishing operation.

In accordance with this invention, generally stated, the burnishing tool which is of usual construction, having a mandrel and a roller-cage assembly, movable axially with relation to the mandrel before expanding the rollers. In order to lift the heavy roller-cage assembly when the tool is used in a vertical position, a holder is connected to the mandrel assembly by a thread and is arranged to engage a collar on the roller-cage assembly so that by turning the holder in its thread, the roller-cage assembly may be lifted and positioned for operation of the tool. The said collar has an abutment or stop engageable with a similar abutment on the holder so that when the mandrel is rotated, thereby causing the roller-cage assembly to rotate at a lower speed, the engagement of said abutments retards the holder so as to cause it to turn in its thread. The pitch of the thread is made opposite to the direction of rotation of the mandrel, that is, if the mandrel rotates right-handed, a left-hand thread is used, and vice versa. Thus, the relative movement of the mandrel and the holder causes the latter to be retracted axially until said abutments escape from engagement with each other, after which the holder rotates with the mandrel with no further axial travel relative thereto.

Referring now to the drawing, the tool comprises a set of rollers 1 mounted in a cage 2 and surrounding a tapered mandrel 3. The cage 2 is secured to a tubular shank 4 surrounding the stem 5 of the mandrel 3. Bearing sleeves 6 may be provided to center the stem in the tubular shank 4. The upper end of the stem 5 is provided with a thread 7 and a squared portion 8 to which a driving device of any suitable type may be connected to rotate the mandrel.

Mounted on the thread 7 is an adjusting nut 9 which may be fixed in its adjusted position by a set screw 10. The nut 9 has a flange 11 on which is rotatably mounted a collar 12. A bearing housing 13 is screwed into the collar 12 and fixed therein by a set screw 14. A housing sleeve 15 is screwed into the lower end of the housing 13. Secured between the housing 15 and an internal shoulder in the housing 13 is a ball bearing 16. The stem 5 of the mandrel is provided with a keyway 17 adapted to receive a key 18 secured in the housing 13. This key maintains the housing assembly 12, 13, 15 against rotation with reference to the stem 5, while the nut 9 may be rotated for adjustment of said housing along said stem.

A holder 19 is provided with a thread 20 engaging a matching interior thread in the end of the housing 15. Said holder is provided with an exterior collar 21 by means of which the holder may be manipulated. Said collar has an internal flange 22 engageable with a flange 23 on the housing 15 to prevent said holder from being removed entirely from the housing 15. The upper end of the holder 19 is provided with one or more stops in the form of teeth 24, only one of which is shown in the drawing. A collar 25 secured to the shank 4 is provided with one or more similar teeth or stops 26 on its lower edge. These stops are arranged for mutual engagement as will be explained presently.

When the tool is set up for use to burnish a bore, indicated at 27, the mandrel is usually supported by suitable driving mechanism connected to the squared portion 8. In order to prepare the tool for operation, the operator rotates the collar 21 so as to turn the holder 19 in such direction as to move it upward by action of the thread 20. As it moves upward, the teeth 24 engage the collar 25 and lift the roller-cage assembly, including the rollers 1, cage 2, and the shank 4. Said assembly is lifted in this way until the upper end of the shank 4 engages the bearing 16 at 28. The tool is then set so that the rollers 1 partly enter the bore 27. The nut 9 is then turned on the thread 7 to adjust the mandrel to such a point as to limit the maximum expansion of the rollers 1. The nut 9 is then clamped in position by the set screw 10.

Operation of the tool is now started by rotating the stem 5. The usual construction of tapered rollers 1 set at a slight angle with the axis of the mandrel 3 is used so that the rolling of the rollers within the bore 27 tends to cause a downward feed of the mandrel 3. Such downward feed of the mandrel relative to the rollers is limited by the setting of the nut 9 to a movement only sufficient to take up the slack in the tool. However, after such limit has been reached, the rollers will continue to feed the tool downward in the bore 27, maintaining a constant diameter for said bore and producing a burnished finish therein. During this movement, the roller-cage assembly rotates at a lower speed than the mandrel, usually about one-third of that speed. Accordingly, before the completion of the first revolution, the movement of the holder 19, turning with the mandrel, will cause the teeth 24 to engage the teeth 26. Thereupon, the movement of the holder will be retarded so as to cause it to rotate with the shank 4 at a lower speed than that of the housing 15 which rotates with the stem 5. This relative movement between the holder 19 and the housing 15 will cause the thread 20 to impart a retrograde or downward movement to the holder 19. As this movement continues, the holder moves away from the collar 25 until the tooth 24 escapes from engagement with the tooth 26, as indicated in Fig. 2. Thereafter, the holder will again rotate with the stem 5 and the remaining parts of the tool will continue to operate in a normal manner as it moves through the bore 27. When the rollers have moved through that bore far enough for the pressure between them and the mandrel 3 to be relieved, the roller-cage assembly will drop downward to the position indicated in Fig. 3.

It will be seen, therefore, that this invention provides a simple device whereby a tool of this type may be handled in a convenient manner in spite of the great weight of the parts, so that it can be set quickly and accurately for starting its burnishing operation.

Various changes may be made in the details of construction, within the scope of the appended claims, without departing from the spirit of this invention. Parts of the invention may be used without the whole and improvements may be added while retaining some or all of the advantages of the invention.

We claim:

1. In an expanding tool of the character described having a mandrel element and a roller-cage assembly element, said elements being rotatable relatively for the expanding operation of the tool, a holder having threaded engagement with ine of said elements and engageable with the other to shift the same relatively by movement in its thread, and means actuated upon operation of the tool to rotate said holder in its thread to return the same to its disengaged relation.

2. In an expanding tool of the character described having a mandrel element and a roller-cage assembly element, said elements being rotatable relatively for the expanding operation of the tool, a holder having threaded engagement with one of said elements and engageable with the other to shift the same relatively by movement in its thread, and a stop on said other element engageable by said holder upon relative rotary movement of said elements during operation of the tool to retard its rotary movement thereby to impose retrograde movement upon said holder in its thread to return said holder to its disengaged relation.

3. In a tool of the character described having a mandrel element and a roller-cage assembly element, means for temporarily supporting the weight of said assembly element when the tool is operated in vertical position including a holder on said assembly element having a threaded connection with said mandrel element operable to lift said assembly element, and means actuated upon operation of the tool to release said assembly from said holder.

References Cited in the file of this patent
UNITED STATES PATENTS

| | | |
|---|---|---|
| 1,613,502 | Couch | Jan. 4, 1927 |
| 2,040,440 | Maupin | May 12, 1936 |
| 2,045,787 | Maupin | June 30, 1936 |